No. 656,328. Patented Aug. 21, 1900.
E. T. POLLARD.
MACHINE FOR FILLING BOXES.
(Application filed Dec. 24, 1898.)

(No Model.) 9 Sheets—Sheet 1.

Witnesses:

Inventor:
Edward Thomas Pollard
By Richard R
his Attorneys

No. 656,328. Patented Aug. 21, 1900.
E. T. POLLARD.
MACHINE FOR FILLING BOXES.
(Application filed Dec. 24, 1898.)
(No Model.) 9 Sheets—Sheet 4.

Witnesses:

Inventor:
Edward Thomas Pollard
By Richards
his Attorneys.

No. 656,328. Patented Aug. 21, 1900.
E. T. POLLARD.
MACHINE FOR FILLING BOXES.
(Application filed Dec. 24, 1898.)
(No Model.) 9 Sheets—Sheet 5.
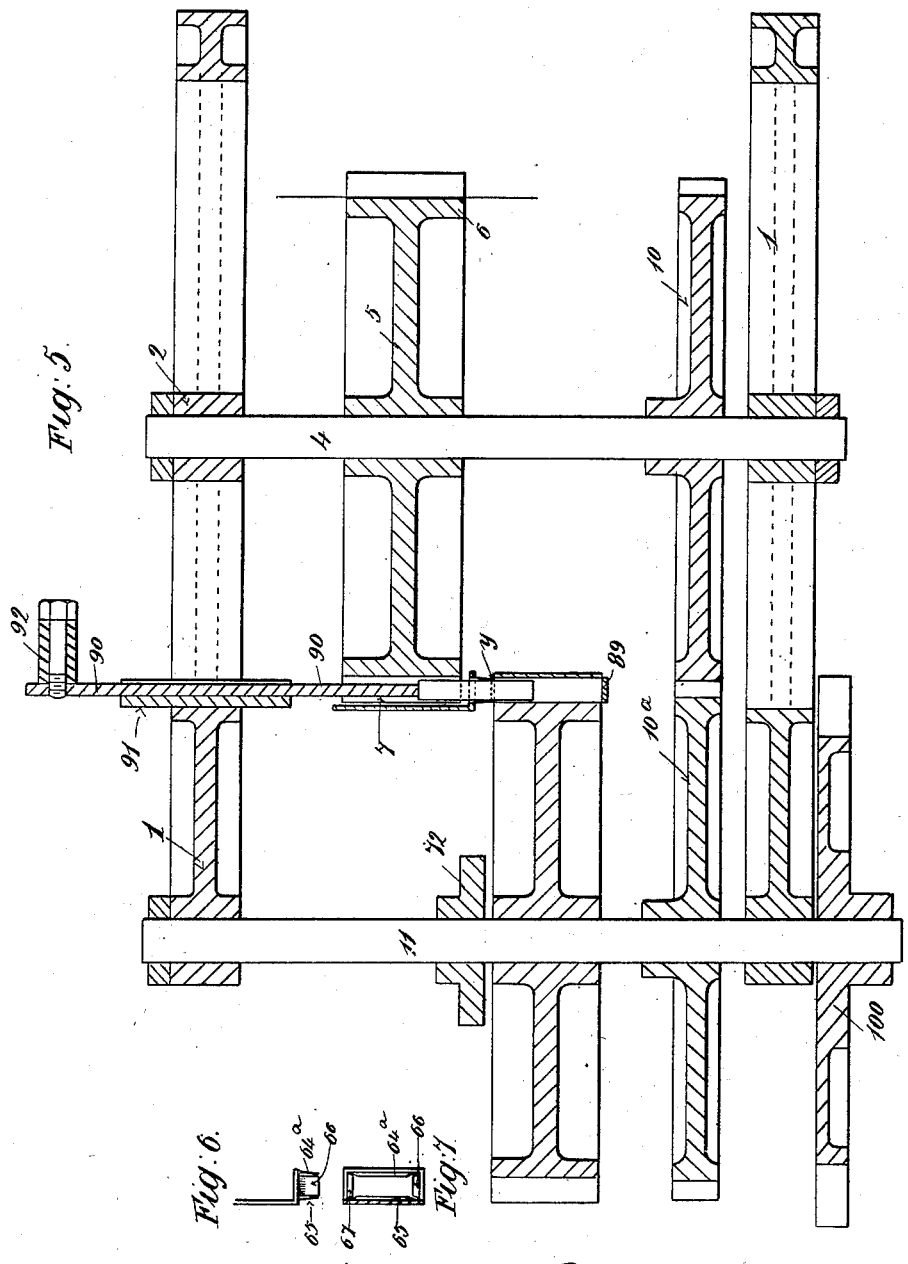

No. 656,328. Patented Aug. 21, 1900.
E. T. POLLARD.
MACHINE FOR FILLING BOXES.
(Application filed Dec. 24, 1898.)
(No Model.) 9 Sheets—Sheet 6.
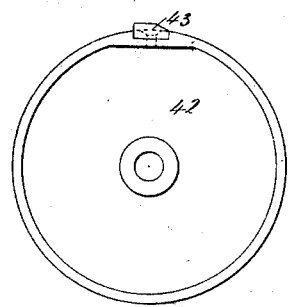
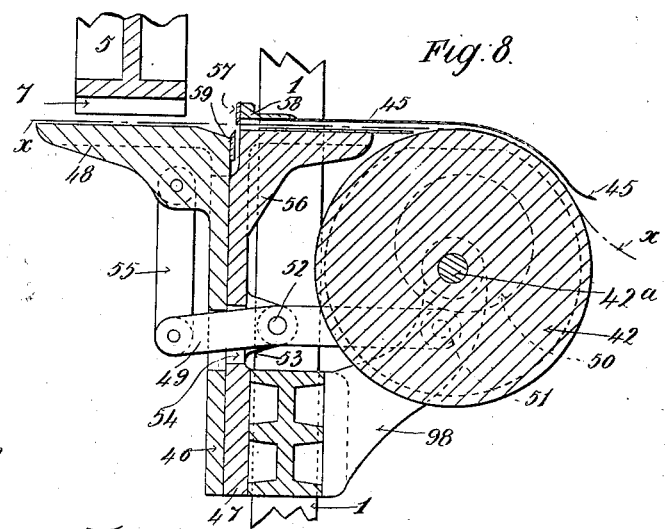
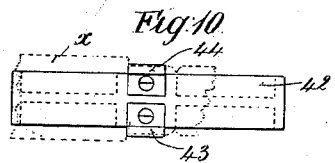
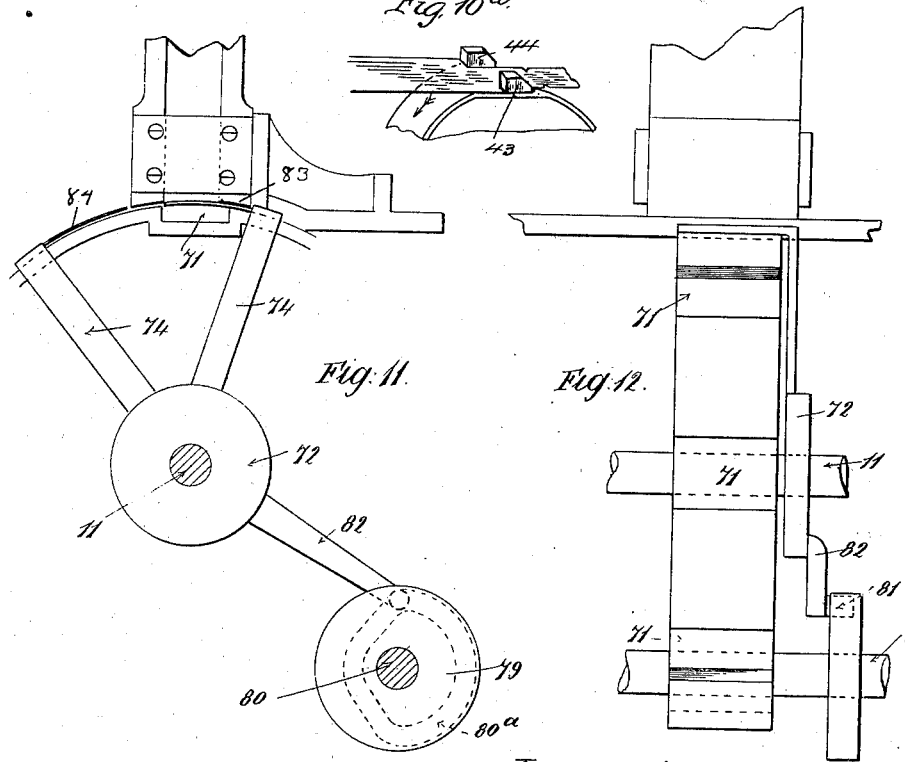
Witnesses:
Inventor:
Edward Thomas Pollard
By Richardson
his Attorneys.

No. 656,328. Patented Aug. 21, 1900.
E. T. POLLARD.
MACHINE FOR FILLING BOXES.
(Application filed Dec. 24, 1898.)
(No Model.) 9 Sheets—Sheet 7.
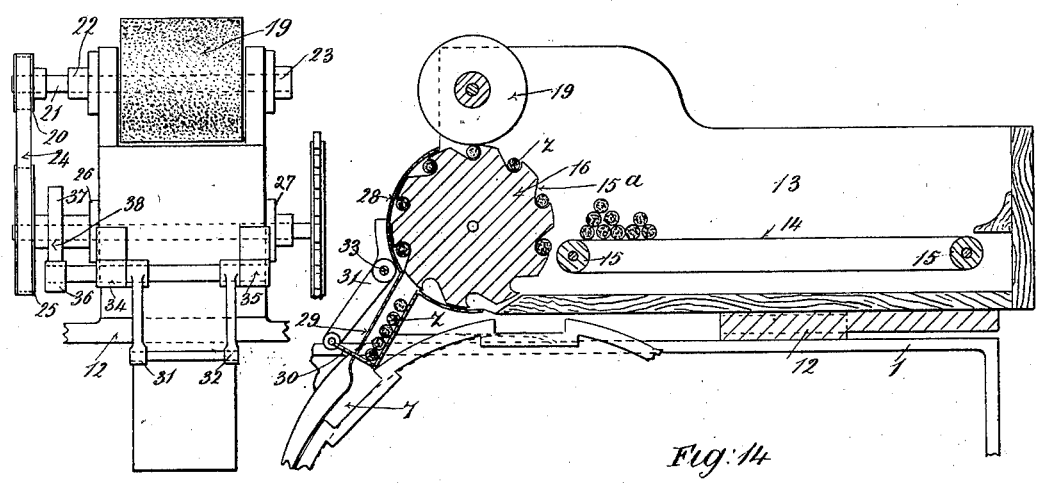
Fig. 13. Fig. 14.
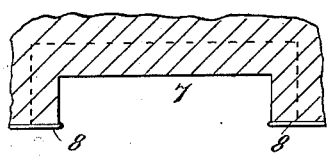
Fig. 15.
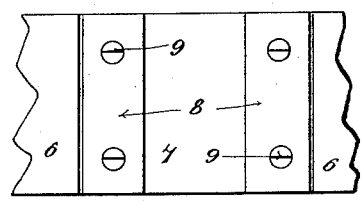
Fig. 16.
Fig. 17. Fig. 18. Fig. 19. Fig. 20. Fig. 21. Fig. 22.
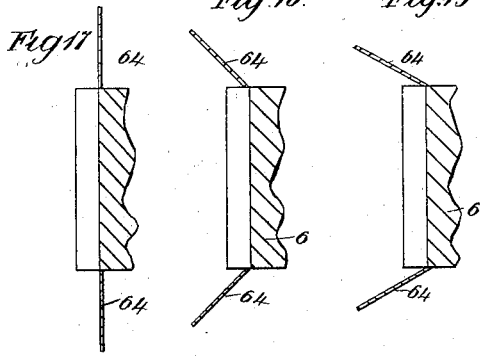
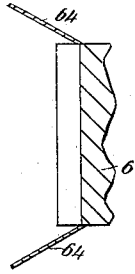
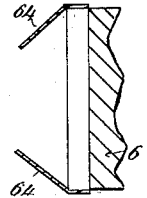
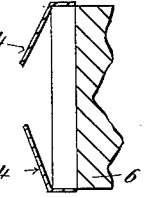
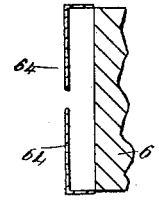
Witnesses:
E. B. Bolton
Inventor:
Edward Thomas Pollard
By Richard
his Attorneys

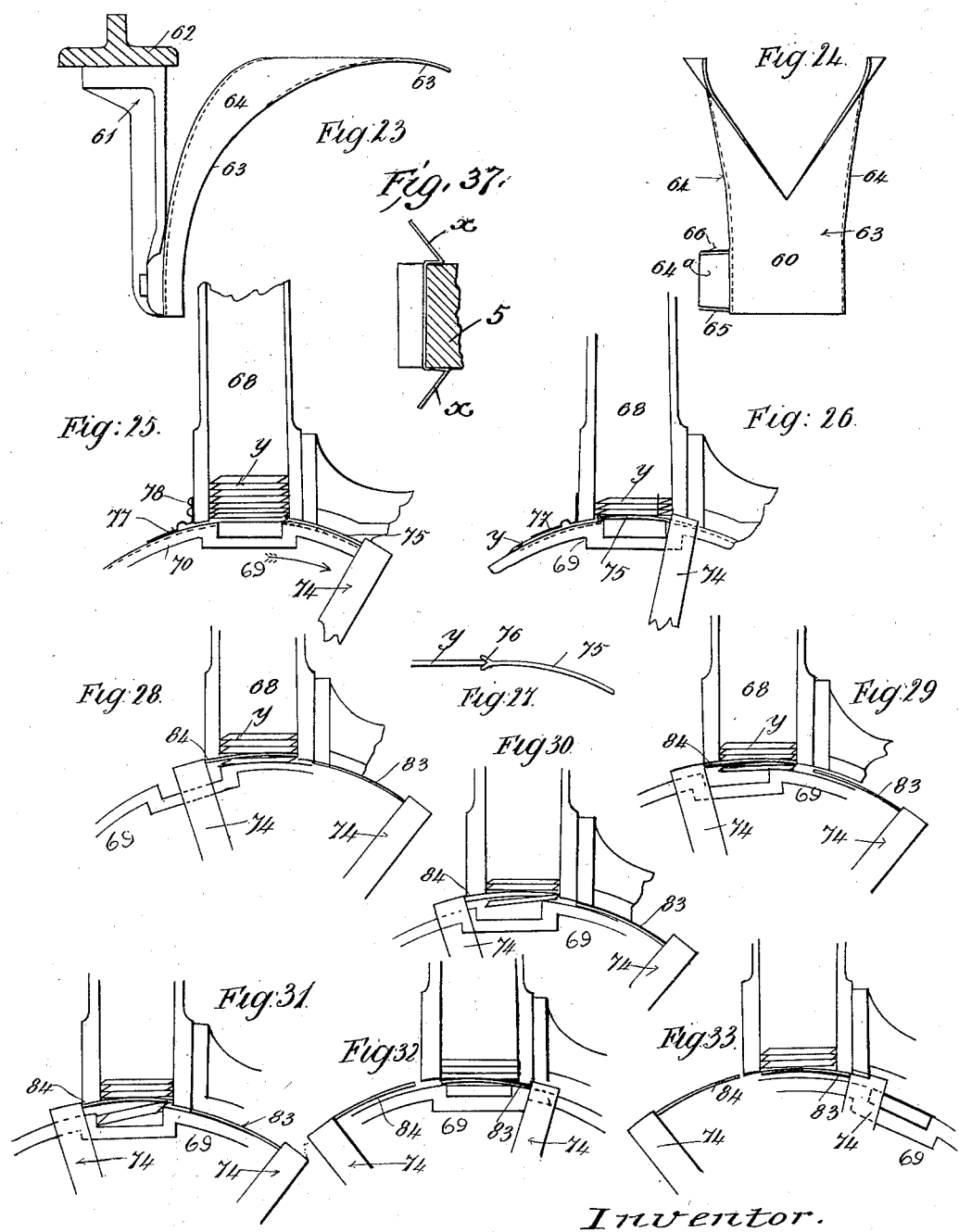

No. 656,328. Patented Aug. 21, 1900.
E. T. POLLARD.
MACHINE FOR FILLING BOXES.
(Application filed Dec. 24, 1898.)
(No Model.) 9 Sheets—Sheet 9.
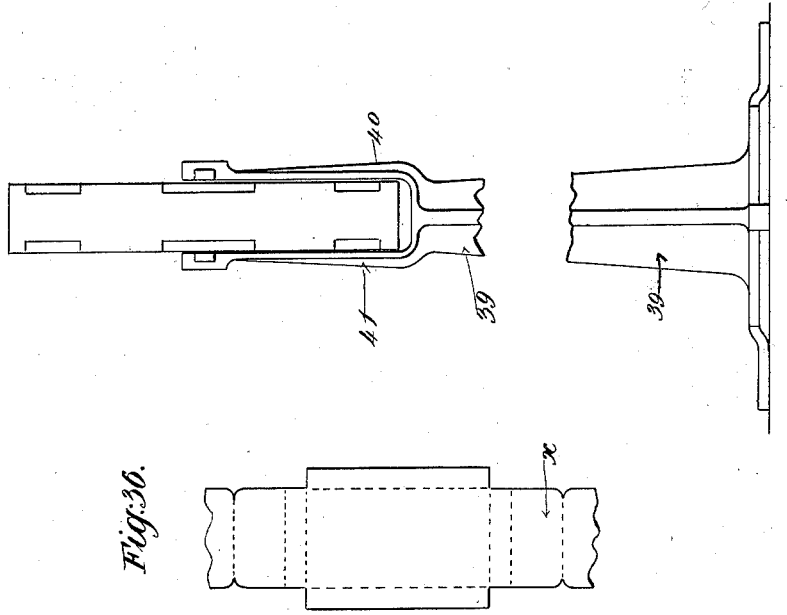
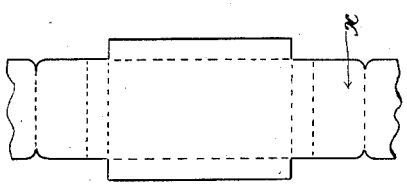
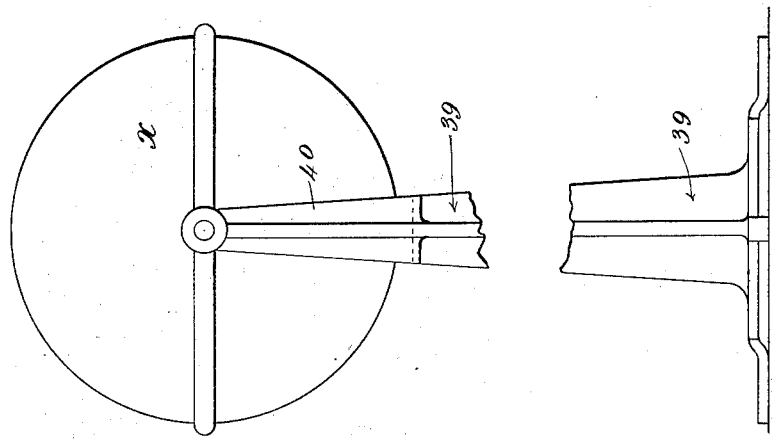
Witnesses: Inventor:
Edward Thomas Pollard
By Richard
his Attorneys.

UNITED STATES PATENT OFFICE.

EDWARD THOMAS POLLARD, OF LONDON, ENGLAND.

MACHINE FOR FILLING BOXES.

SPECIFICATION forming part of Letters Patent No. 656,328, dated August 21, 1900.

Application filed December 24, 1898. Serial No. 700,222. (No model.)

*To all whom it may concern:*

Be it known that I, EDWARD THOMAS POLLARD, a citizen of the United States of America, residing at 4 and 5 Gough Square, London, England, have invented certain new and useful Improvements in Machines for Forming, Filling, and Printing Upon the Slide Cases or Boxes in which are Packed Cigarettes, Cigars, or the Like; and I do hereby declare the following to be a full, clear, and exact description thereof.

This invention relates to an improved machine for forming the inner or slide portion of the packets or cases in which cigarettes are packed for sale from a continuous web or roll of paper, the said slides being printed upon or not, as may be required, and, after being filled with cigarettes, placed in the outer case ready for sale.

Figure 1:
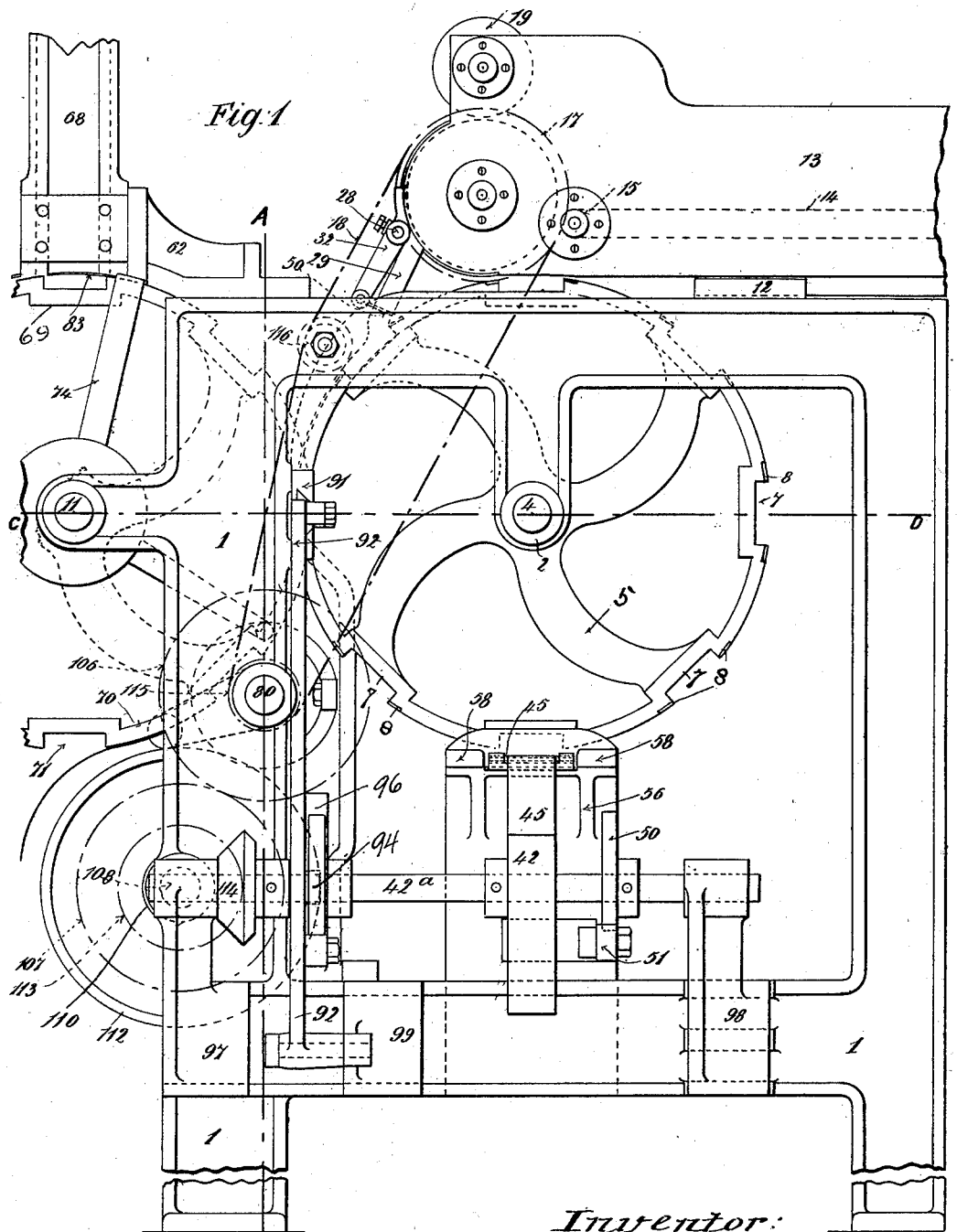
Figure 2:
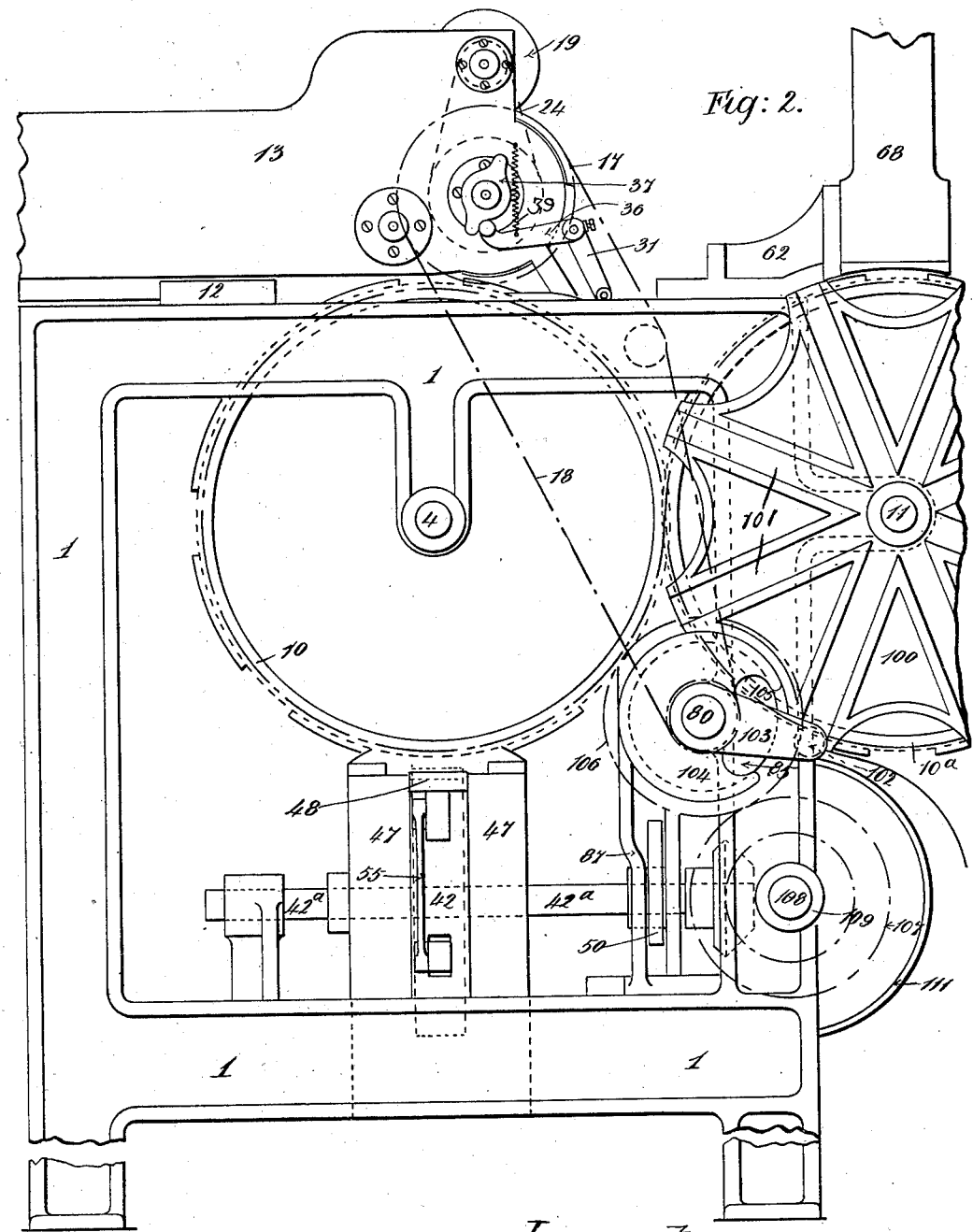
Figure 3:
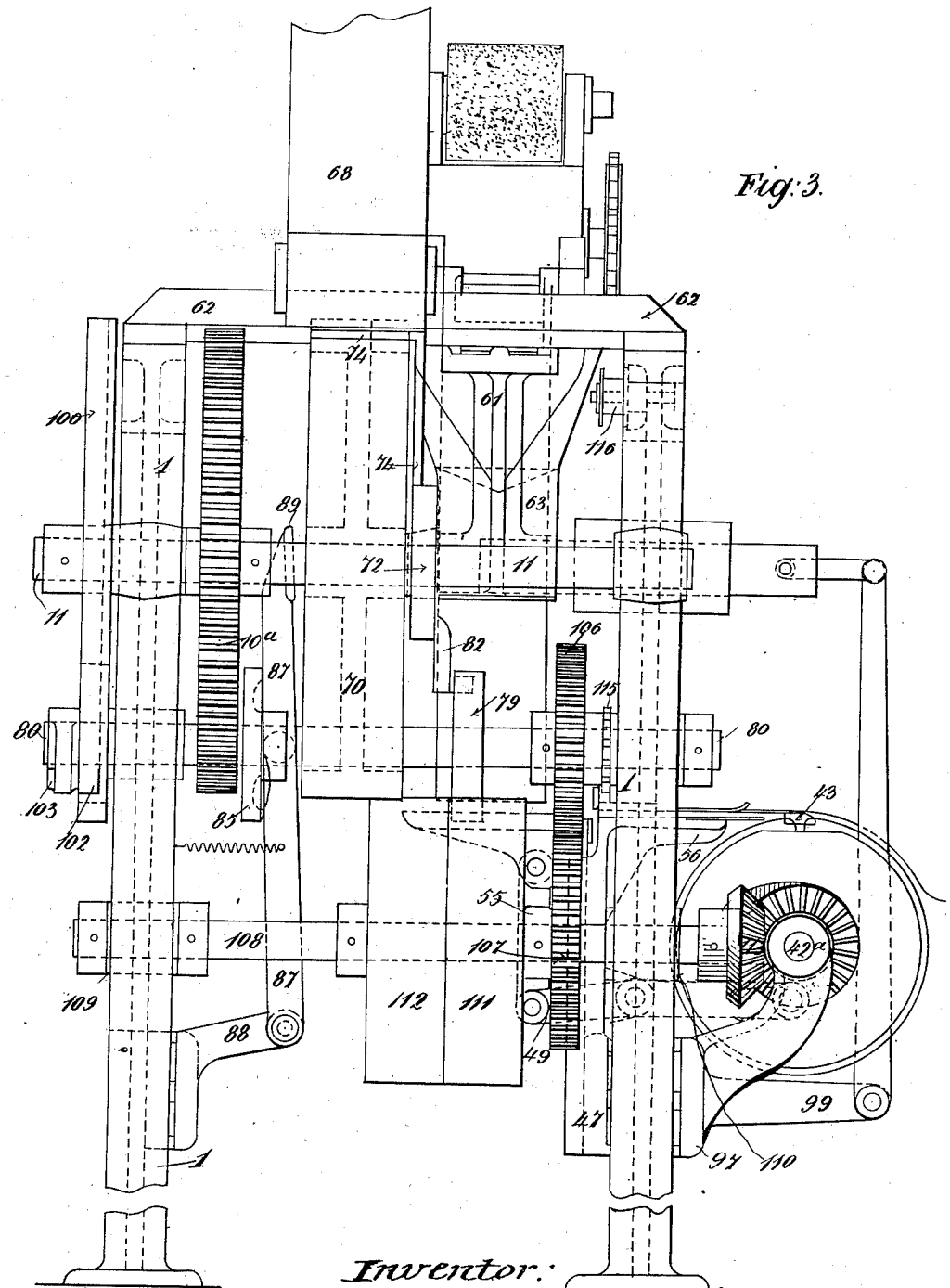
Figure 4:
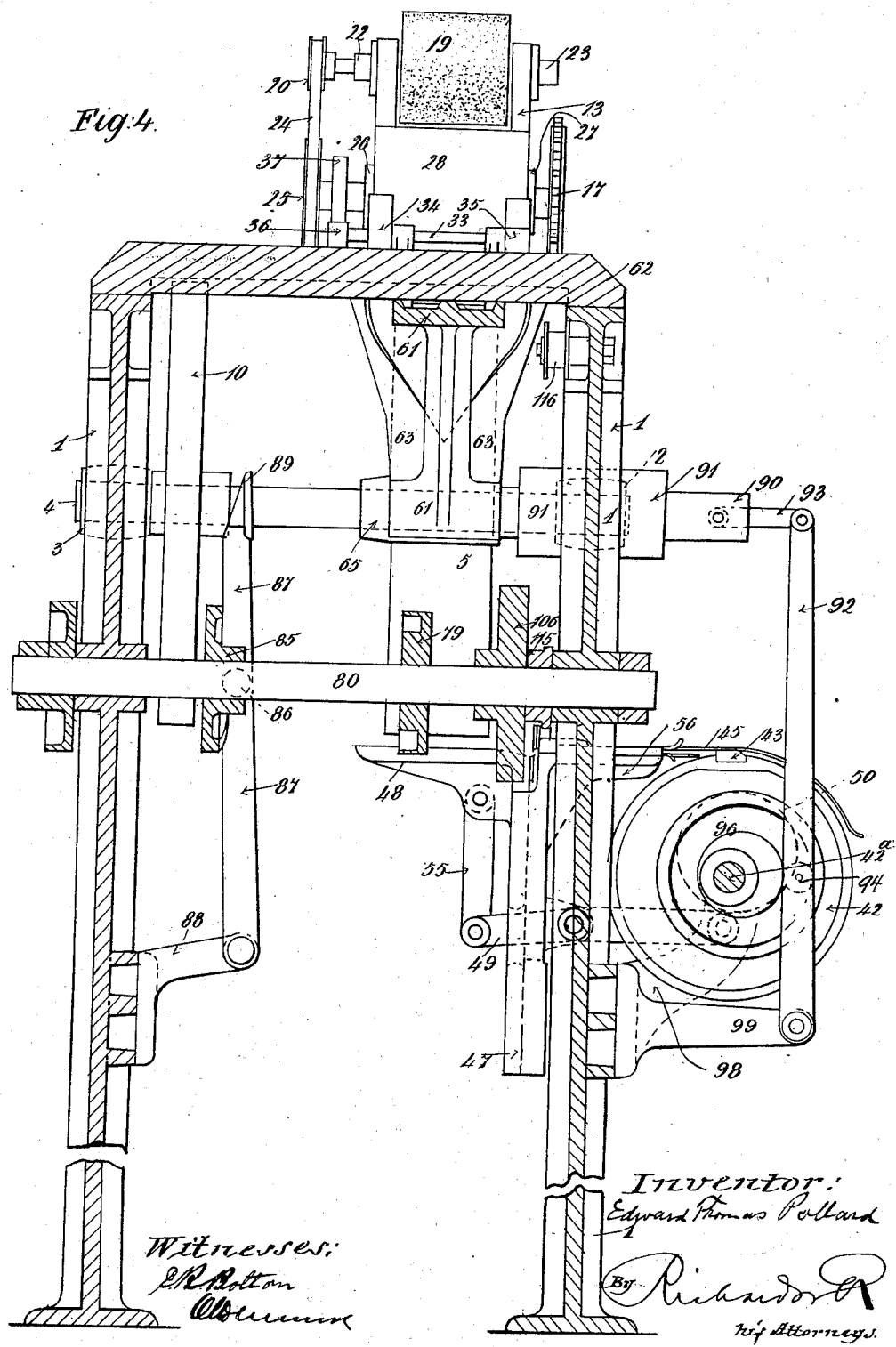

In the accompanying drawings, Figure 1 is a front elevational view of the machine. Fig. 2 is a back view; Fig. 3, an end view; Fig. 4, a sectional view upon line A B, Fig. 1. Fig. 5 is a sectional view on line C D, Fig. 1. Figs. 6 and 7 are respectively a side view and plan of a device for insuring the entry of the filled slide into the outer case. Fig. 8 is a sectional view of the mechanism for forcing the slide into its recess and cutting it from the main web X. Fig. 9 is a side view of the feeding device for the web. Fig. 10 is a plan of the device shown in Fig. 9, the web being indicated by dotted lines, and Fig. 10$^a$ is a perspective detail. Fig. 11 is a front elevational view of the device for insuring the proper delivery of the outer cases to the machine. Fig. 12 is a side view of Fig. 11. Fig. 13 is a front elevational view of the cigarette-hopper and delivery mechanism. Fig. 14 is a sectional view of the cigarette-hopper. Fig. 15 is an enlarged sectional view showing more clearly the form of the recess in which the slides are held during the operations of forming and filling same with cigarettes. Fig. 16 is a plan view of a portion of the face of wheel 5, showing one of the recesses. Figs. 17 to 22 are views illustrating the various stages of the turning down of the ends of the slides. Figs. 23 and 24 are respectively a side and front view of the device for turning over the ends of the slide. Figs. 25 and 26 are views showing an alternative form of device for the delivery of the outer cases to the machine. Fig. 27 is an enlarged view of a detail of the construction of the device shown in Fig. 26. Figs. 28 to 33 are views showing the delivery of the outer case to the mechanism by which it is held while the inner or slide portion is being inserted. Figs. 34 and 35 are respectively a side and front elevation of the device for carrying the main roll of paper or card from which the slides are formed; and Fig. 36 is a view of a portion of the web, showing its form and indicating by dotted lines the scored portion which is afterward turned over by the machine. Fig. 37 is a view illustrating the action of a portion of the feed device.

1 1 are the side frames of the machine, which are cast or otherwise formed, as indicated by the drawings, and which have formed upon them bearings 2 3, in which rotates a shaft 4, running transversely to the frames and upon which shaft is keyed or otherwise secured the wheel 5, having a peripheral flange 6, across which are cut a number of channels 7, having rectangular sides and secured to the top of which, so as to slightly overhang, are plates 8, adjustably secured by the screws or the like, the heads of which lie flush with the surface of the flange 6. The spindle 4 has secured to it at its opposite end a pinion 10 in gear with and operated by a second pinion 10$^a$, mounted upon a transverse shaft 11.

Extending across the top of the frames 1 and secured thereto at its ends by any suitable means, such as screws or bolts, is a plate 12, supporting a cigarette-hopper 13, the hopper lying parallel with the side frames 1. The body of the hopper, which may be of wood or other suitable material, is rectangular in shape and has within it a continuous-moving band or belt 14, (see Figs. 1, 13, and 14,) supported by the rollers 15 and by which band the cigarettes indicated by Z in Fig. 14 are carried forward until they are caught by one of the flutes or channels 15$^a$, formed within the periphery of the cylinder 16 and which cylinder is caused to rotate by means of a chain-wheel 17, secured to its spindle and which wheel is operated by a chain 18, (indicated by dotted lines in Fig. 1,) and to which chain motion is imparted by means hereinafter to be described. To prevent more than one cigarette being accidentally delivered, a circular brush 19 is provided, which brush is superposed above the cylinder 16 and is caused to rotate by means of the pulley 20 upon an extension of its spindle 21, passing through the sides of the hopper 13, to which are secured bearings 22 23. The pulley 20 is actuated by means of the band 24, which band passes around and receives motion from the pulley 25, secured to the spindle of the cylinder 16 and for which spindle-bearings 26 27 are provided, as shown in Figs. 1, 2, 3, 4, 13, and 14. The cigarettes are carried over by the cylinder 16 and during their passage are prevented from falling therefrom by the guard-plate 28, which guard-plate forms part of the inclined chute 29, into which the cigarettes fall and are retained until a sufficient number are collected to fill the inner slide, which in the present instance is assumed to be of such dimensions as to accommodate five cigarettes. When the cigarettes are collected as aforesaid, a small trap 30, by which the lower end of the chute is closed, is raised and the cigarettes fall into the recess 7 within the wheel 5 and in which recess has been placed a slide. The trap 30 is secured to the ends of the levers 31 32, secured to the spindle 33, which spindle is carried by the bearings 34 35, secured to the guard-plate 28. The spindle 33 is extended upon one side beyond the bearing and has secured to it an arm 36, the end of which is in contact with the projections 37 upon the disk 38, mounted upon the spindle of the cylinder 16, a spring 39 (shown in Fig. 2) being provided to keep the said arm in contact with the disk 38. It will be seen from the foregoing that during one revolution of the cylinder 16 the disk will operate the trap 30 twice, the period during which the chute is closed corresponding to the time occupied by the wheel 5 moving one-eighth of a revolution, the discharge of the cigarettes being effected while the said wheel is at rest. The inner slide in which the cigarettes are discharged is formed from a continuous roll of paper or card which has been previously cut and scored so as to facilitate the bending up of the sides and ends, as shown in Fig. 36, in which the scored portions are indicated by dotted lines, the cutting and scoring being performed prior to the web being submitted to the action of the present machine.

The device for holding the main roll of card consists of a column or standard 39, Figs. 34 and 35, having upwardly-extending arms 40 41, between which the roll is supported. The web X is led to the machine, as indicated by dotted lines in Fig. 8, passing around the periphery of the drum 42, which drum, as shown in Fig. 9, has two peripheral projections 43 44, one on each side, adapted to engage with the edges of the web X at the sides and which during its revolution pulls in a length of web sufficient for one slide, the projections 43 44 moving in a circle and advancing the web, which passes through the guide 45 (shown clearly in Figs. 4, 8, and 9 and also in Figs. 1 and 3) to the mechanism for pressing it into a recess within the wheel 5, which is at rest and which device consists of a plate or slipper 46, sliding within a guide 47, which is secured by screws or bolts to the frame 1 of the machine and which is shown in section in Fig. 8. At the top end of the sliding plate is a horizontal plate 48 of approximately the same width as the recesses within the periphery of the wheel 5 and which plate is raised by the lever 49, actuated by a cam 50, (shown dotted in Fig. 8,) which lever has at its end a roller 51 in contact with the periphery of the cam. The lever 49 is pivoted at 52 to a lug 53, cast integral with and upon the outer face of the plate or guide 47, an opening 54 being formed in the guide and also in the slipper 46 for the passage therethrough of the lever 49, the end of which is pivotally secured to the slipper by means of the connecting-bar 55. The plate 47 has at its upper end an extension 56, which serves to support the paper and the guide 45 and has in addition a shear-blade or knife 57, supported by the plate 58, to which latter plate the knife 57 is secured transversely of the web by screws or the like. Upon the slipper 46 and with its outer face lying in the same plane of that of the blade 57 is a second blade 59, adapted to shear the web when the slipper 46 rises and cut off a length of the web, the cutting taking place just when the web is held by the slipper in the recess within the wheel 5, into which the plate upon the slipper forces the blank and while so doing turns up the sides thereof, which when the blank has been pressed home are retained in position by the plates 8, hereinbefore referred to. Upon the completion of the above operations the wheel 5 revolves, carrying with it the blank, the ends of which project on either side of the wheel 5, as shown in Fig. 5, and which ends are turned down by the folding device 60 (shown clearly in Figs. 23 and 24) and which is supported by a bracket 61, secured to the plate 62, arranged transversely of the frame of the machine, and to which plate is secured the magazine for the outer cases.

The folder 60, the action of which is illustrated in Figs. 17 to 22, consists of a plate 63, having its sides 64 turned at right angles to the plate 63, so as to engage with the ends of the blanks where they extend beyond the flange of the wheel 5 and turning over the said sides until they lie in the same plane as the back of the slide, forming a box-like case with the front portion closed by the said ends, and into which before the sides are turned over the cigarettes are allowed to fall, as before described, the wheel then being at rest.

Secured to the lower part of the folder 60 and in such a position as to be directly opposite the outer case when the same is at rest are spring-plates 64ª 65 66 67, Figs. 6 and 7. These springs consist of four short tapered pieces of thin sheet metal secured in any suitable manner to the inside of an oblong opening formed in the turned-over end of the folder for the slide portion. The opening is of somewhat larger dimensions than the size of the slide and is arranged between the two wheels 5 and 69 in a line with the respective recesses therein when the corresponding wheels are at rest. The springs project toward the outer case retained by the wheel 69 and are each inclined inward, forming altogether a square truncated pyramid with flexible walls or sides. The function of the spring-plates is to insure the proper insertion of the inner slide within the outer case, the said cases being placed in the magazine 68, secured to the plate 62, before referred to, and arranged in such a position that the mouth of the magazine shall be directly over a second wheel 69, the construction of which is identical with that of wheel 5, but the peripheral flange 70 of which is somewhat less in width than the length of the outer cases, which when placed in the recesses 71, formed in said wheel, overhang or protrude upon one side. Upon the outer case being raised the smaller end of the cone enters the mouth thereof, and when the filled and folded slide is thrust out from its recess in the wheel 5 it passes through the opening, spreading or expanding the springs 64ª, 65, 66, and 67, which thus guide the said slide into its outer case. This is clearly shown in Fig. 5 and in detail in Figs. 4, 6, and 7.

The outer cases in the magazine 68 lie vertically one upon the other transversely of the wheel 69 and are taken therefrom one by one, being pushed out at the lower end of the machine by the reciprocating arm 74 and plate 75, secured thereto and provided at its forward end with a V-shaped channel 71, which comes into contact with the side of the outer case and pushes it out sidewise from the magazine against the direction of motion of the wheel onto the periphery thereof, where it is retained by the spring 77, attached by screws 78 to the side of said magazine, and which spring holds the case while one of the recesses in the wheel advances and when sufficiently advanced pushes down or inclines the case, which it will be understood is when collapsed wider than the recess in the wheel, and therefore is inclined across the said recess, so that the forward side falls into and engages with the wall of the recess, being gradually pushed along until the opposite side of the case strikes against the edge of the magazine, which completes the opening or setting up of the said outer case, the weight of the superposed cases in the magazine assisting to keep the case from sliding out of the recess. The movement of the arm 74 is effected by means of a cam 79, secured to the shaft 80, and in the face of which is cut a race 80ª, (indicated by dotted lines in Fig. 11,) in which race is a roller 81, secured to the end of an arm 82, secured to the disk 72.

Instead of the device illustrated for feeding the cases I may employ two arms 74 74 upon the disk 72, as shown in Figs. 28 to 33 and also in Fig. 1, which plates would alternately come into the mouth of the magazine and relieve the lowest case of the weight of the supposed collapsed cases $y$ therein. The plate upon the left hand would, as shown in Fig. 28, first come into action and pass between the lowest case and the one next above it, the case then lying upon the periphery of the wheel 69, and would rest there while the recess within the flange 70 was advancing toward it, the case gradually falling until its side edge was in a position to be engaged by the side of the recess within the flange, which presses against and causes the case to gradually expand or open until the recess is directly under the case when it will fall therein, (see Fig. 32,) at which period the other arm with its plate comes into action, allowing the case to pass along, the next case then resting thereon when it is in a position to be again brought onto the periphery of the wheel. The action of the step-by-step feeding device is similar, only in this case the lowest case is released by the plate 84 and falls into the approaching recess, in which it lies in an inclined position, the forward slide resting upon the bottom of and abutting against the wall thereof, and the other side projecting above the periphery of the wheel 69 by which it is pushed round, causing the elevated side to abut against the lower end of the side of the magazine 68, the action of the parts being the same as if the collapsed case was squeezed between the finger and thumb. The second plate 83 serves to relieve the lowest case from the weight of the superposed cases which might prevent the free action of the mechanism.

Secured to the shaft 80 is a case 85, upon the face of which bears a roller 86, secured to the lever 87, which lever is pivotally secured at its lower end to the bracket 88, carried by the frame and upon the inside thereof, (see Fig. 4,) and which lever has at its opposite end a square foot or plate 89, normally situated just beyond the extending end of the outer case $y$ when in the recesses within the flange of the wheel 69, and which plate is caused, when the two respective recesses within the wheels 5 and 69 are directly opposite each other, to push the outer case inward when the springs upon the folder enter the mouth of the case, (see Fig. 5,) insuring the perfect insertion therein of the now filled and folded slide, which insertion is effected by the plunger 90, for which a guide 91, secured to the frame, is provided, and which plunger comes into contact with the end of the filled case, pushing it home into the outer case $y$, the slide passing through the springs 64ª 65 66 67, which insure the slide being properly pushed into the outer case. The plunger 90 is actuated by the lever 92, pivotally secured at one end to the said plunger by the connecting radius bar or link 93, and which lever has a roller 94, engaging a race or cam groove in the cam 96, mounted upon the shaft of the feed-drum 42 for the web, which shaft is supported by brackets 97 98, secured upon the outside of the frame of the machine. (See Figs. 1, 2, 3, 4, and 8.) The end of the lever 92 is pivotally secured to the bracket 99, (shown clearly in Fig. 4,) which bracket is secured upon the outside of the frame. The two wheels 5 and 69, as aforesaid, communicate motion one to the other by means of the pinions 10 and $10^a$, secured, respectively, to the shafts or spindles 4 and 11, which wheels, as shown in Figs. 1, 2, 3, 4, and 5, are in gear one with the other.

The shaft 11 has mounted upon it at its rear end, outside the frame 1, a channeled plate 100, which radial channels 101 are cut upon the outer face of the said plate and are of sufficient depth to receive a roller 102 upon the end of an arm 103, (see Fig. 2,) which arm forms part of the circular plate or disk 104, secured to the end of the shaft 80, and which plate is cut away, as shown at 105, to permit of the free rotation of the plate 100 during such time as the roller 102 is engaged with the channels, the curved portion of the disk, when the roller is free of the channel, serving by its engagement with the curved radius between the channels to prevent any accidental movement of the channeled plate 100. Also secured to the shaft 80 is a pinion 106 in gear with a similar pinion 107, secured to the shaft 108, carried by bearings 109 110, formed in the frames 1, and which shaft is provided with a fast and loose pulley 111 112 for a belt from an external motor. The shaft 108 also imparts motion by the miter-wheel 113 to a second miter-wheel 114, secured to and operating the shaft of the feed-drum 42.

The chain 18, described as actuating the feed mechanism for the cigarettes, receives its motion from a chain-wheel 115, secured to the shaft 80, and which chain, as shown, passes around the said wheel over an idle guide-wheel 116 to the chain-wheel upon the feed-drum within the cigarette-hopper.

Having now particularly described and ascertained the nature of my said invention and in what manner the same is to be performed, I declare that what I claim is—

1. In a machine of the kind described the combination with a hopper for holding the collapsed outer cases, of a rotary drum having a plurality of pockets in its periphery adapted to aline successively with said hopper, means for transferring the collapsed outer cases from said hopper to the recesses and opening them therein, means for imparting to said drum an intermittent rotary movement, and means for inserting into said outer cases the filled inner cases or slides, substantially as described.

2. In a machine of the kind described, the combination with the rotating drum having recesses for the inner slides of the boxes with means for imparting an intermittent rotary motion to said drum, of a hopper for the cigarettes, a rotary wheel therein having a plurality of pockets for picking up the cigarettes from the hopper, a chute extending from said hopper into proximity to the drum and arranged to receive the cigarettes from the pockets of the feed-wheel, and means for closing the mouth of the chute and opening it when a predetermined number of cigarettes have accumulated therein, substantially as described.

3. In a machine of the kind described, a drum having a series of recesses for holding the inner slides, a second drum having a similar series of recesses for the outer cases, said drums being arranged with their peripheries overlapping, means for feeding the inner and outer cases to the respective drums, means for imparting an intermittent rotary movement to said drums to cause the respective recesses to successively aline, and a hollow guide arranged to enter the open end of the outer slide to insure the proper insertion of the inner slide with means for operating said guide, substantially as described.

4. In a machine of the kind described, the combination with the hopper for holding a supply of outer cases, and the rotating drum having a plurality of recesses arranged to aline successively with said hopper, of the means effecting the removal of the lowermost case from the hopper into the recess of the drum comprising rocking arms located on opposite sides of the hopper, plates carried by said arms adapted to enter the hopper from said opposite sides, and means for alternately rocking said arms, substantially as described.

In witness whereof I have hereunto set my hand in presence of two witnesses.

EDWARD THOMAS POLLARD.

Witnesses:
JOHN H. JACK,
JOSEPH LAKE.